Aug. 19, 1969  F. W. GRANTHAM  3,462,138
LAUNDRY FOLDER
Filed April 25, 1966  7 Sheets-Sheet 1
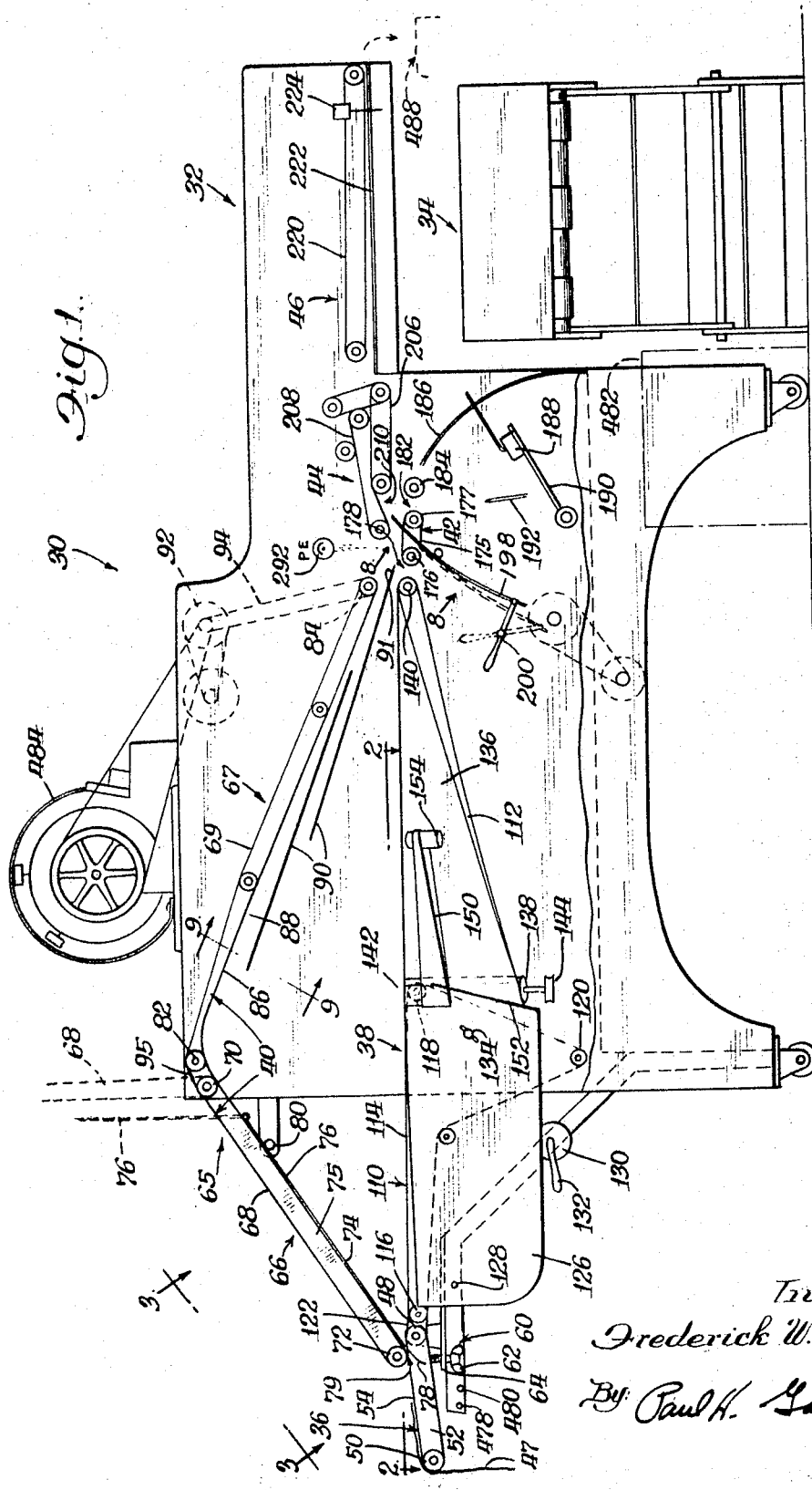
Inventor:
Frederick W. Grantham
By: Paul H. Gallagher
Atty.

Aug. 19, 1969　　　F. W. GRANTHAM　　　3,462,138
LAUNDRY FOLDER
Filed April 25, 1966　　　　　　　　　　　7 Sheets-Sheet 2
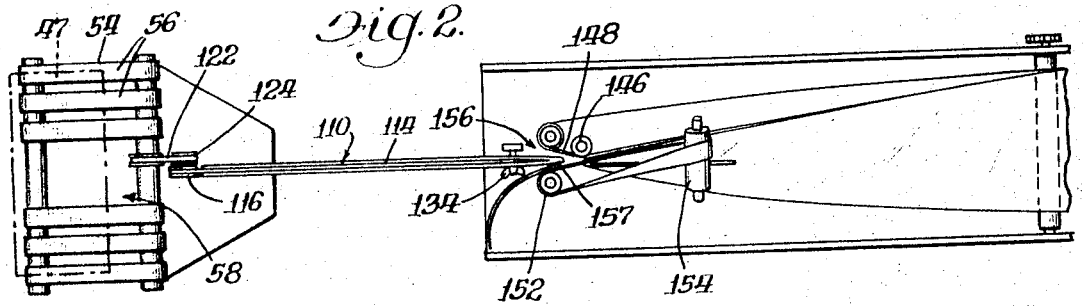
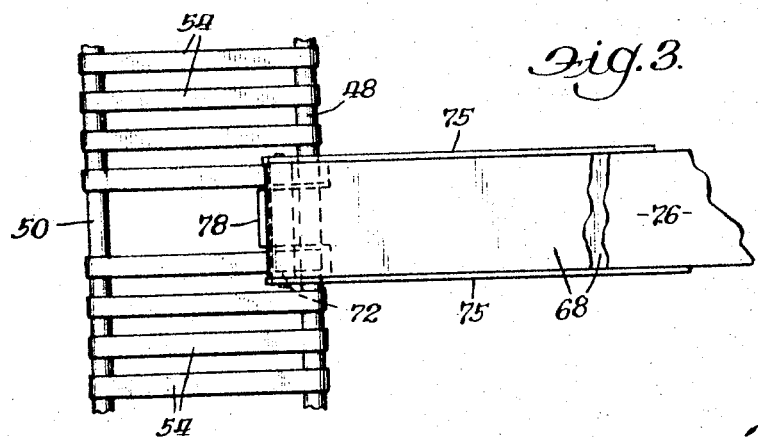
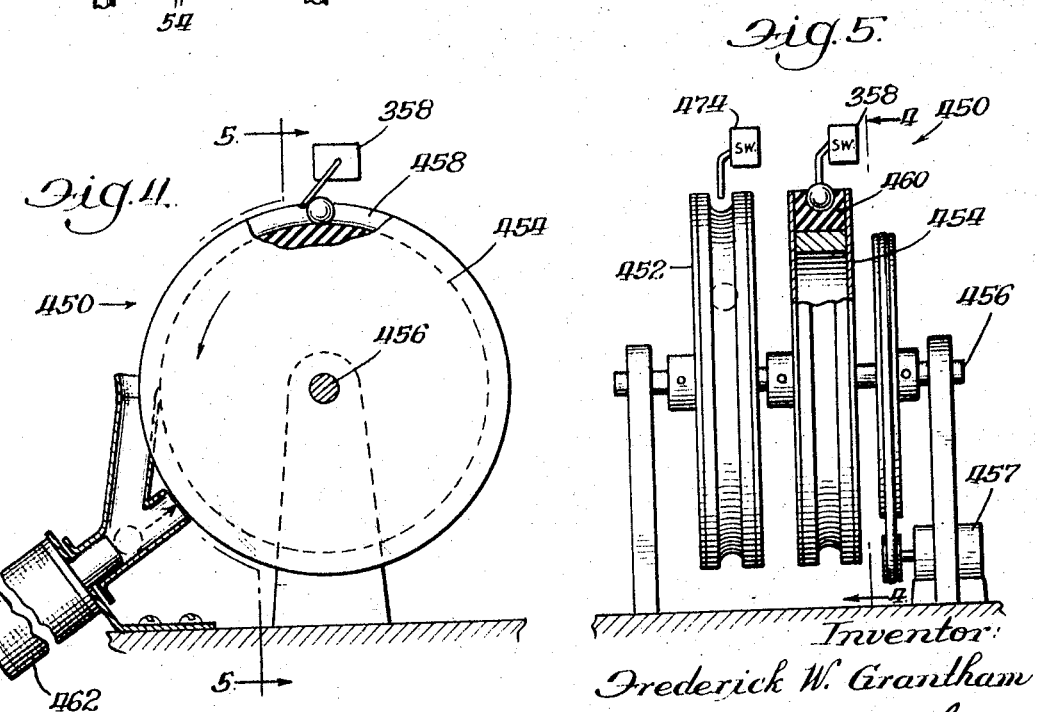
Inventor:
Frederick W. Grantham
By Paul H Gallagher
Atty.

Aug. 19, 1969  F. W. GRANTHAM  3,462,138
LAUNDRY FOLDER
Filed April 25, 1966  7 Sheets-Sheet 3
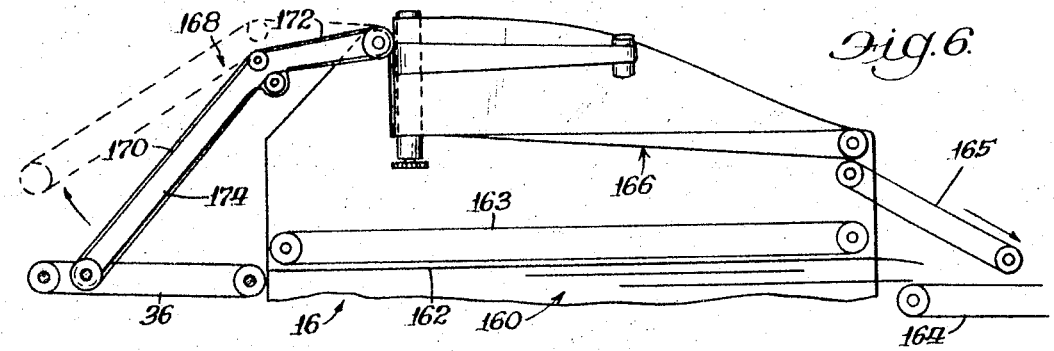
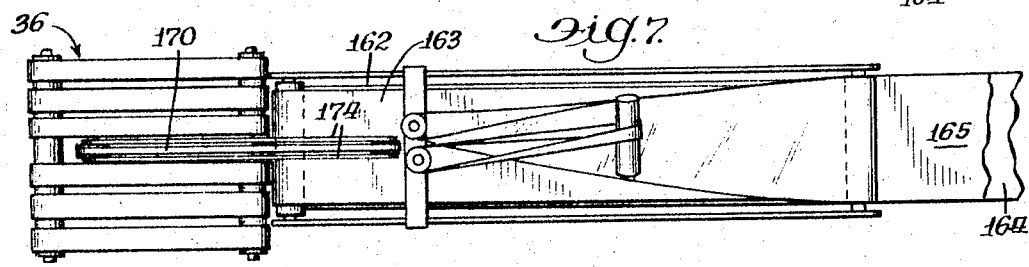
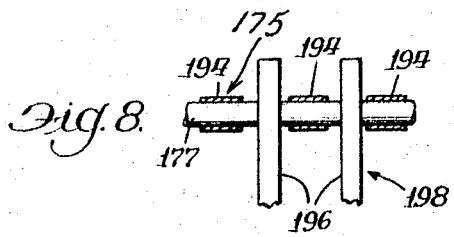
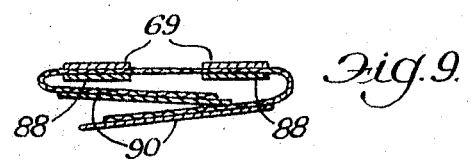
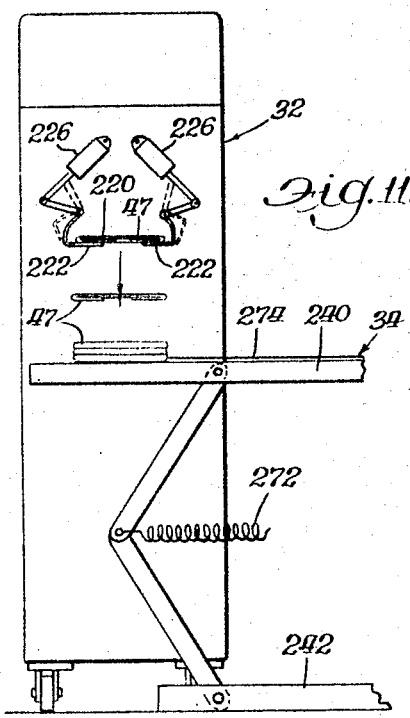
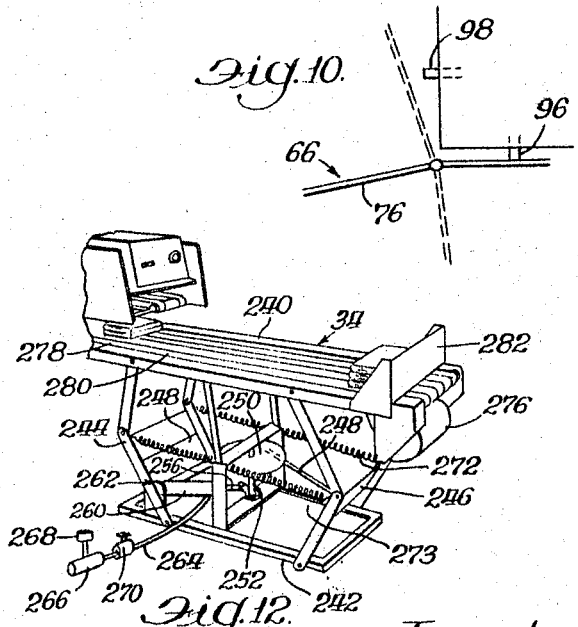
Inventor:
Frederick W. Grantham
By Paul K. Gallagher Atty.

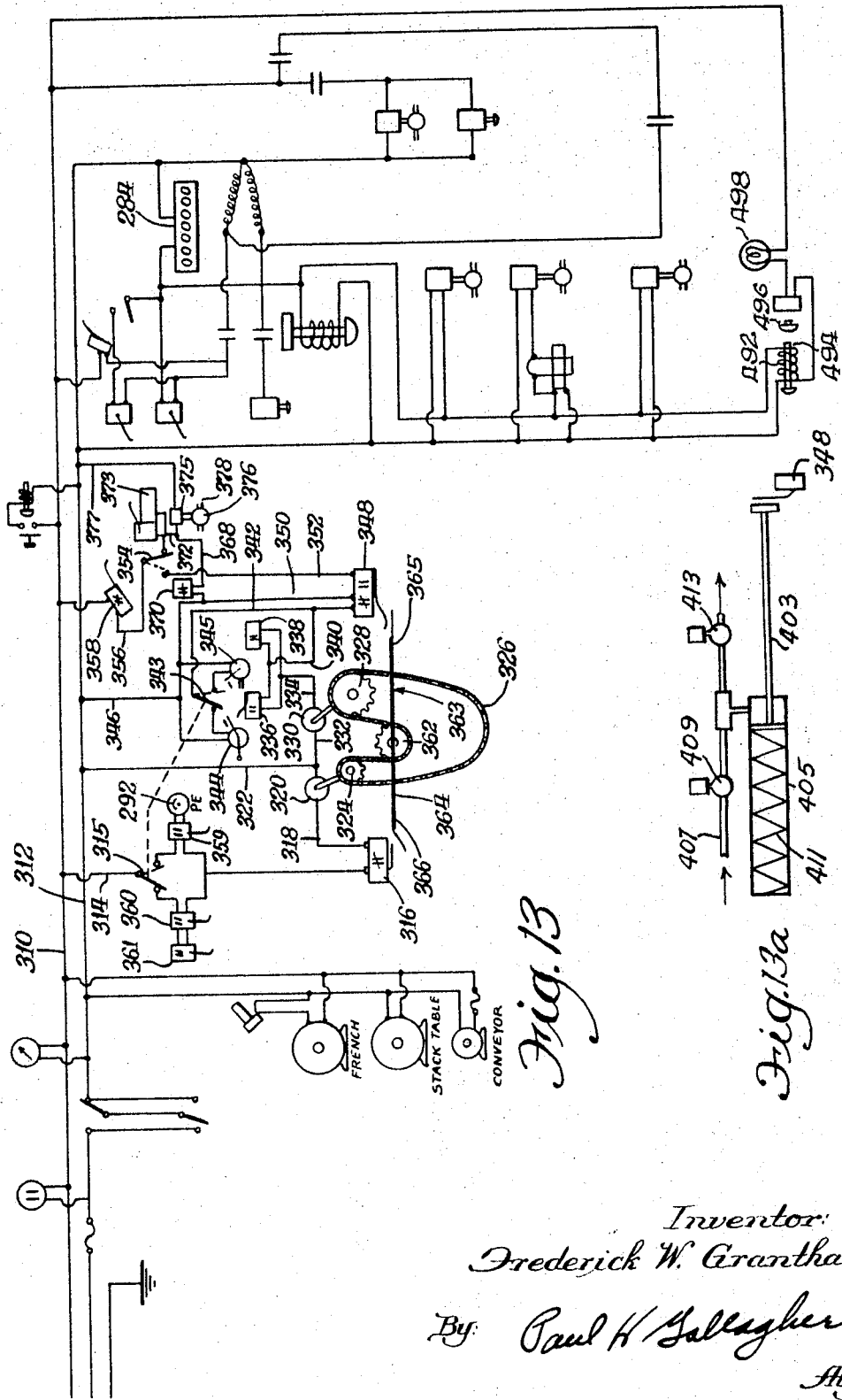

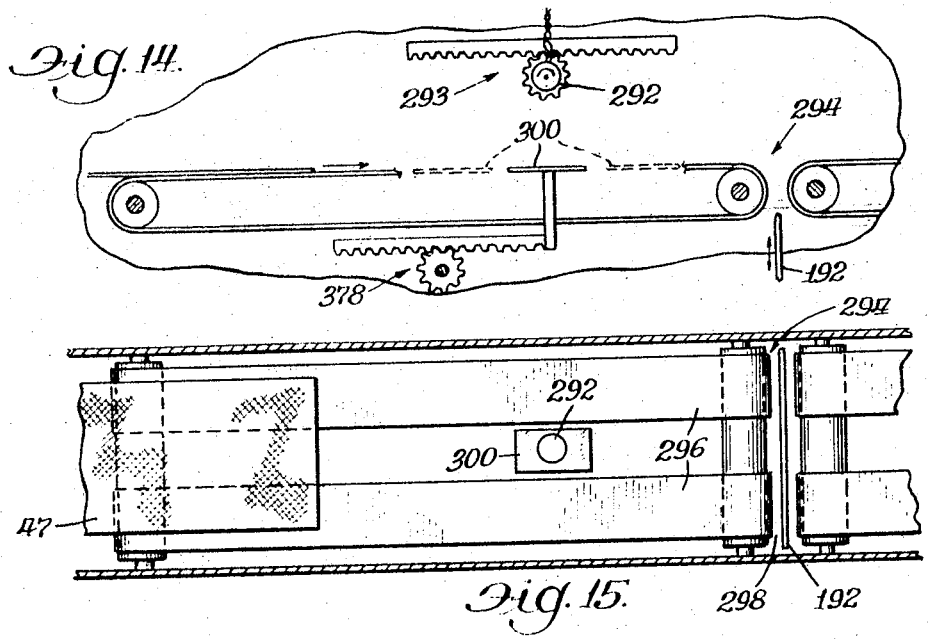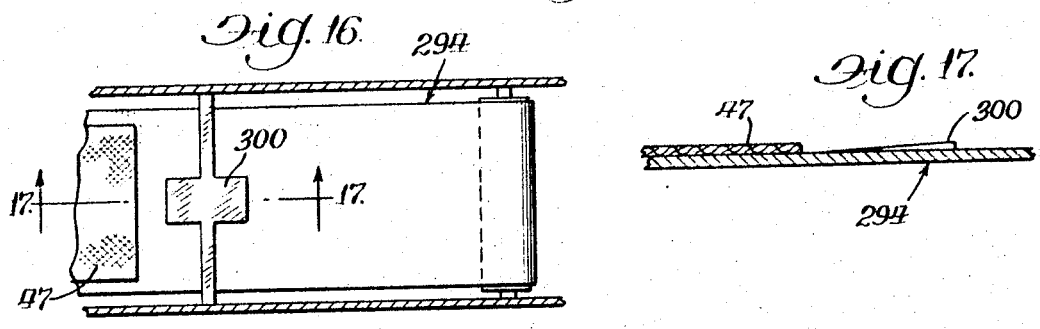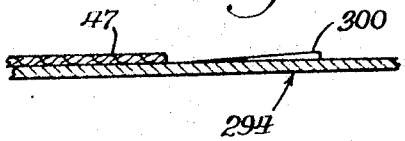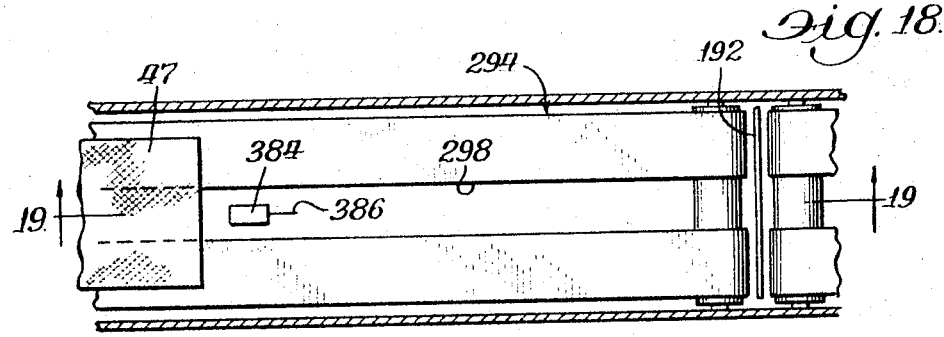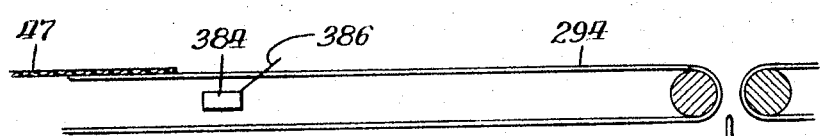

Aug. 19, 1969      F. W. GRANTHAM      3,462,138

LAUNDRY FOLDER

Filed April 25, 1966      7 Sheets-Sheet 6

Inventor:
Frederick W. Grantham
By Paul H. Gallagher
Atty.

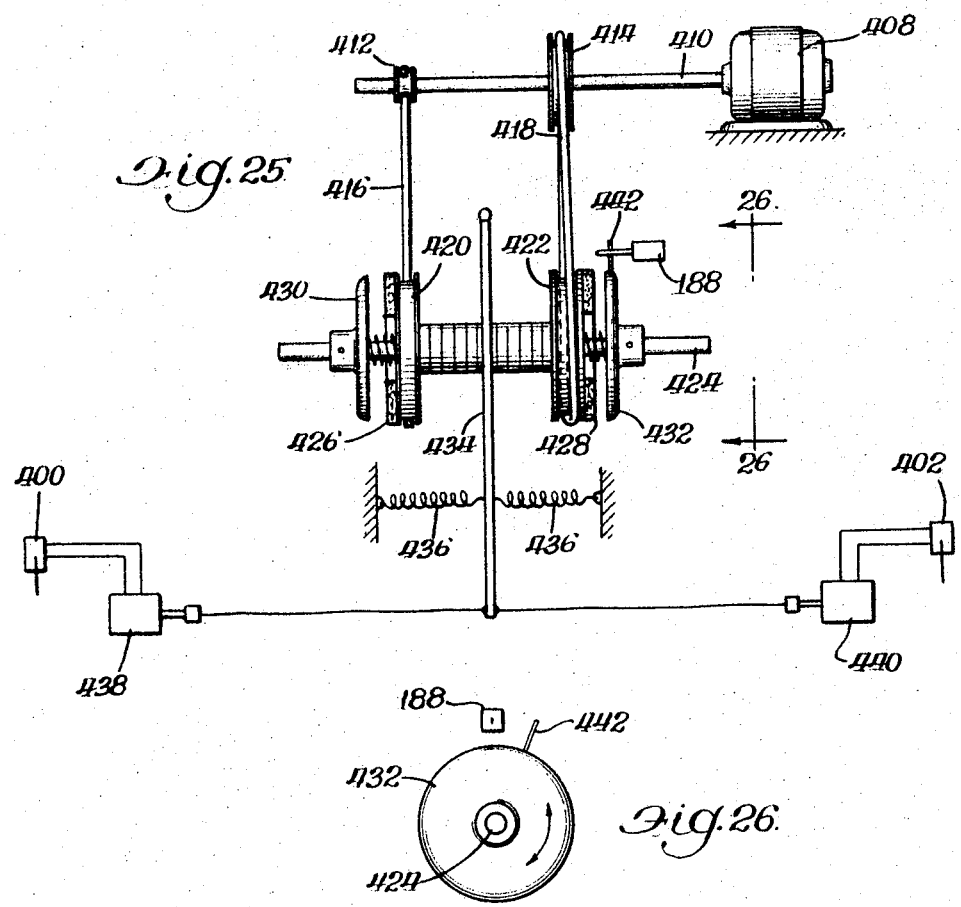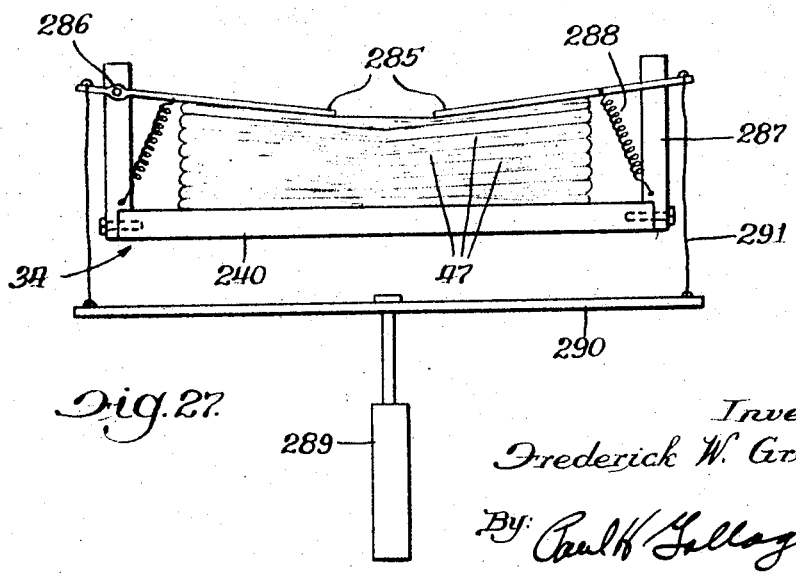

United States Patent Office 3,462,138
Patented Aug. 19, 1969

3,462,138
LAUNDRY FOLDER
Frederick W. Grantham, Hollywood, Calif.
(152 W. Pico Blvd., Los Angeles, Calif. 90015)
Filed Apr. 25, 1966, Ser. No. 545,823
Int. Cl. B65h 45/12; D06f 89/00
U.S. Cl. 270—62                                      10 Claims

ABSTRACT OF THE DISCLOSURE

Laundry folder for folding small pieces, and including a plurality of different kinds of folding means (such as quarter fold and french fold), selectively operable and arranged for receiving the pieces from a common feedboard.

---

The present invention relates to a laundry folder.

A broad object of the invention is to provide a laundry folder which is extremely flexible in its functioning, being capable for example of producing a quarter fold and a french fold selectively, as well as performing numerous other functions.

A more specific object is to provide a novel laundry folder capable of producing a french fold and a quarter fold selectively, by an extremely simple adjustment that can be easily and quickly made by the operator of the folder.

Another object is to provide a laundry folder of the character just referred to having a novel construction including a conveyor belt and backing pieces making up a unit that is movable into and out of an operative position and when in operative position being effective for producing a french fold and when in inoperative position the folder is effective for producing a quarter fold.

An additional object is to provide a laundry folder for use in folding laundry pieces of various sizes such as napkins, towels, bath mats, etc. and having novel construction for folding the pieces according to their lengths without adjustment for the different lengths.

A still further object is to provide a laundry folder of the character just referred to in which pieces of different lengths can be folded in random order, and the folder is effective for folding each piece at a predetermined position, such as the middle, regardless of the length of the piece.

A further object is to provide a laundry folder having a series of conveyor means for conveying the laundry pieces through the folder, and including novel means for transferring pieces over gaps between adjacent conveyors.

Still another object is to provide a laundry folder of the character just referred to in which the means for conveying the pieces over the gaps is particularly effective for functioning regardless of the condition of the towels, particularly regardless of the degree of dampness thereof.

A further object is to provide in a laundry folder of the character referred to, means for transferring laundry pieces over gaps between successive conveyors, that is adjustable in a novel manner for centering the laundry pieces relative to successive components in the folder posterior to the particular gaps.

An additional object is to provide means for transferring laundry pieces over gaps between successive conveyors which includes a pair of belts having adjacent runs gripping the laundry pieces therebetween, and together forming means for effectively gripping the laundry pieces from the conveyor anterior thereto, whereby the interacting runs of the belts are effective for conveying the laundry pieces regardless of the condition of dampness of the laundry pieces.

A still further object is to provide a folder of the foregoing general character having means for making half folds, as well as other folds, and novel means for selectively rendering the half folding means operative and inoperative.

An additional object is to provide in a laundry folder novel means for ejecting defective pieces.

A further object is to provide in a laundry folder means for ejecting defective pieces which includes a novel arrangement under the manual control of the operator of the machine, including a movable member such as a wheel and a plurality of elements such as balls which can be implanted in the wheel at the desired moment and location and the balls are carried by the wheel to ultimate positions wherein they control means for ejecting the respective pieces.

Another object is to provide a folder for folding laundry pieces including means for stacking the folded pieces in an operation in which the pieces are stacked by dropping them into a stack, and to provide in such folder novel means for tamping the pieces in the stack pursuant to their being dropped.

Another object is to provide in a laundry folder of the foregoing general chartcer, a novel stack table, on which the folded pieces are stacked.

A further object is to provide in a laundry folder a stack table onto which folded laundry pieces are dropped in a stacking operation, and in which the stack table includes a novel construction enabling adjustment of its height to compensate for the height of the stack as the latter increases.

Still another object is to provide in a laundry folder a stack table of the character just referred to in which the table may be set at a selected elevated position manually, and which lowers without the control of the operator as the stack increases in height.

An additional object is to provide in a laundry folder, novel means for indicating jam conditions of the folder.

A further object is to provide in a laundry folder, a jam indicator of the character referred to which is so arranged as to operate cyclically and in the absence of jamming in the folder, it operates as means for pacing the operating steps of the operator of the machine.

Other objects and advantages of the invention will appear from the following detail description taken in conjunction with the accompanying drawings wherein—

FIGURE 1 is a vertical longitudinal view of the apparatus, partially diagrammatic in nature;

FIGURE 2 is a horizontal view taken at line 2—2 of FIGURE 1;

FIGURE 3 is a view taken at line 3—3 of FIGURE 1;

FIGURE 4 is a side view of a timing means with a portion broken away;

FIGURE 5 is a view from the right of FIGURE 4;

FIGURE 6 is a side view of a portion of a modified form of apparatus;

FIGURE 7 is a top view of the apparatus shown in FIGURE 6;

FIGURE 8 is a detail view taken at line 8—8 of FIGURE 1;

FIGURE 9 is a sectional view taken at line 9—9 of FIGURE 1;

FIGURE 10 is a fragmentary view of a switch control means;

FIGURE 11 is a view from the right of FIGURE 1;

FIGURE 12 is a perspective view of the stack table and portion of the holder unit;

FIGURE 13 is a diagram of the main portion of the circuit utilized in the apparatus;

FIGURE 13a shows a modified form of means for controlling a folding operation;

FIGURE 14 is a detail view of a sensing means and conveyor means;

FIGURE 15 is a top view of the elements of FIGURE 14;

FIGURE 16 is a top view of a modified form of sensing means and conveyor means;

FIGURE 17 is a sectional view taken at line 17—17 of FIGURE 16;

FIGURE 18 is a top view of another form of sensing means and conveyor means;

FIGURE 19 is a view taken at line 19—19 of FIGURE 18;

FIGURE 25 illustrates another sensing means;

FIGURE 26 is an end view taken at line 26—26 of FIGURE 25; and

FIGURE 27 illustrates the tamper.

Figure 20:
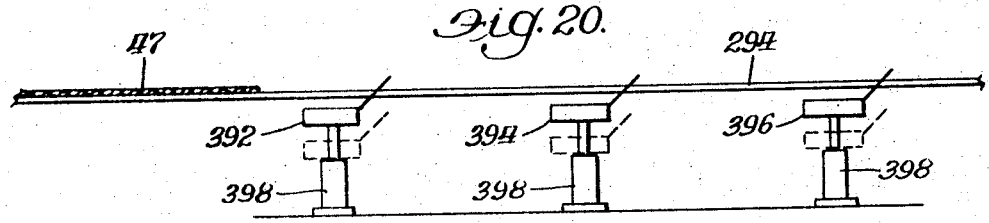
FIGURE 20 is a side view of still another form of sensing means and conveyor means.

Attention is now directed to the details of construction of the folder as shown in the accompanying drawings.

GENERAL

The apparatus including the features of the invention is indicated in its entirety at 30 and includes two main units, namely a folder per se 32 and a stack table 34 which is a separate unit from the folder and preferably detached therefrom, but the two cooperate together as a single apparatus.

The apparatus disclosed herein includes certain features also disclosed and claimed in my prior applications Ser. No. 377,231, filed June 23, 1964, now Patent No. 3,339,-914, issued Sept. 5, 1967, and Ser. No. 457,742, filed May 21, 1965, to which reference is made for further description of various features common to the present apparatus.

The folder unit

The folder unit 32 includes as its main components, a feed board 36, conveyor means indicated in its entirety at 38 and made up of a pair of successive conveyors utilized in making a quarter fold, additional conveyor means indicated in its entirety at 40 utilized in making a french fold, an extension conveyor 42, an intermediate or pick-up conveyor 44 and a final or delivery conveyor 46. Other elements or components are also utilized in conjunction with the foregoing components, as will be described hereinbelow. In the normal operation of the apparatus, the operator places the laundry pieces 47 on the feedboard 36 and they proceed next onto the quarter fold conveyor means 38 or the french fold conveyor means 40 according to the predetermined setting of the unit, and then proceed along the remaining conveyors until they reach the delivery conveyor 46 which, in conjunction with other elements, drops the folded laundry pieces onto the stack table 34.

Feedboard

The feedboard 36 is also a conveyor and includes an upper roller 48, a lower roller 50 mounted on side pieces 52. Trained on the rollers is belt means 54 preferably made up of a plurality of belt elements 56 arranged in two groups (FIGURE 2) spaced apart laterally leaving a gap 58 between the groups. The belt means provides a generally flat top surface for placement of the laundry pieces thereonto, for feeding therefrom into the next successive conveyor means 38 or 40. Preferably the side pieces 52 are mounted for swinging movement about the axis of the upper roller 48 to adjust the inclination of the feedboard, the feedboard preferably being horizontal in transverse direction. The gap 58 is for the purpose of enabling cooperation between the feed board and the french fold conveyor means 40 when the latter is in operative position, as described hereinbelow. Both the conveyor means 38 and 40 begin adjacent the delivery end of the feedboard for receiving the laundry pieces from the latter.

The feedboard is adjustable merely by grasping the lower roller 50 and lifting it or lowering it, and the feedboard may be retained in adjusted position by fixed elements providing constant friction of sufficient force for that purpose. Alternatively, suitable means such as releaseable securing means 60 may be provided for holding it in position and this means may include a screw 62 operable upon turning thereof for adjusting the feedboard. For example, the screw may be threaded in a fixed element 64 of the frame and working against the feedboard in both directions of threading thereof.

French fold means

The french fold conveyor 40 is included in a french fold unit indicated in its entirety at 65. The unit includes two sections 66 and 67 and the conveyor includes two belts, 68 and 69, in the respective sections. The belt 66 may be a single wide belt, or a plurality of narrow belt elements, and is trained on an upper roller 70 fixed in location, and a lower roller 72 mounted in the extended end of an arm 74 including a pair of side pieces 75 pivoted at their upper ends. Cooperating with the belt 68 is a slide 76 which may be in the form of a stainless steel plate, preferably of substantially the same width as the belt with its lower end extension 78 projecting downwardly beyond the lower roller 72. The section 66 is swingable between a lower operative position shown in full lines in FIGURE 1 and an upper inoperative position shown in dot-dash lines and when it is in its lower position, the extension 78 of this slide extends into the gap 58 and below the upper surface of the belt 54. In such operative position of the section, the lower run of the belt 68 is closely adjacent to the upper run of the belt 54 in the feedboard and as the latter belt carries the laundry piece forwardly, the piece proceeds into the bight 79 between the extension 78 and the belt 68 and is carried by the latter between the belt and the slide 76, upwardly into the section 67 of the french fold unit. Suitable stop means 80 may be provided for positively limiting the arm 74 in the lower position. Preferably the slide 76 is curved upwardly in its mid portion, and the lower run of the belt rests thereon, assuring gripping of the piece by the belt.

The belt 69 is in the form of a plurality of belt elements (FIGURE 9) trained on an upper roller 82 and a lower roller 84, the slide 76 having an extension 86 projecting into register with the belt 69. The extension 86 thus extends beyond the gap between the series belts 68 and 69, preventing pieces from dropping therethrough, or otherwise becoming snagged or jammed. The section 67 includes a pair of laterally spaced folding blades 88 (FIGURE 9) adjustable toward and from each other for adjusting the width of the french fold, in a known manner. Forming blades 90 are provided for completing the french fold, and one of them is provided with an extension 91 at its lower end (FIGURE 1). The section 67 of the french fold unit in itself is of known kind.

The french fold conveyor belts are driven from a suitable source such as a motor 92 through suitable drive transmitting means 94 connected with the lower roller 84, while drive transmitting means 95 interconnects the rollers 82 and 70. It is within the compass of the invention that instead of two separate belts 68 and 69, a single continuous belt may be utilized. Suitable switch means 96 (FIGURE 10) may be provided for turning on the motor 92 when the section 66 is in lower operative position, and turning it off when it is in upper inoperative position. Similarly other switch means 98 may be provided for turning on the motor for the conveyor means 38 when the section 66 is in its upper inoperative position. The french fold unit, in this instance, thus conveys the pieces from the feedboard upwardly over the quarter fold means and delivers them adjacent the delivery end of the latter.

Quarter fold means

The quarter fold conveyor 38 includes two principal sections, a vertical fold conveyor 110 and a conversion conveyor, or twist belt 112. The vertical fold conveyor 110 includes an endless belt 114 trained on various pulleys including one, 116, at the entry end thereof and another, 118, at the delivery end thereof adjacent the entry end of the conversion conveyor 112. The belt is driven by suitable means through a drive pulley 120. In the present instance the belt 114 is a single strand, relatively narrow belt, for forming a vertical fold. However, it is within the scope of the invention to utilize a pair of laterally spaced belts. The belt 114, is disposed for receiving the laundry piece 47 from the feedboard, when the section 66 is raised to inoperative position. This is accomplished by a connecting link belt 122 (FIGURE 2) leading from the roller 48 and trained on a pulley 124 mounted on the same shaft with the pulley 116. Alternatively the belt 114 can itself be trained on the roller 48. In either case the laundry piece progresses from a flat condition on the feedboard onto the belt 114 and is folded vertically at the desired position according to the positioning of the laundry piece on the feedboard, which is usually in the center.

Associated with the vertical fold conveyor 110 is a shield 126 which may be a pair of plates or a single plate bent to inverted U-shape, and in the latter case the web portion is disposed under the top run of the belt. In either case the shield is pivoted adjacent its entry or leading end as at 128 on the framework for limited vertical swinging movement of its delivery or trailing end. Its trailing end extends beyond the pulley 118 and serves as a bridging means between the belt and the conversion conveyor 112. The adjustability of the shield enables its upper edge at its trailing end to be positioned vertically relative to the belt, from a position adjacent the upper edge of the belt, or thereabove, to a lower position below the upper edge thereof. This vertical adjustability provides for control of the laundry pieces for centering them on subsequent conveyors as referred to hereinbelow. Suitable means may be provided for so adjusting the trailing end of the shield vertically such as a cam 130 having a manipulable lever 132.

It is also preferred that the shield 126 be adjustable horizontally, the connection at the pivot means 128 having sufficient play for that purpose. Suitable adjusting means 134 may be provided for so adjusting the shield. The horizontal adjustments of the shield enable positioning of it relative to the conversion conveyor 112, as referred to again hereinbelow.

The conversion conveyor or twist belt 112 in itself is closely similar to the corresponding conveyor 34 in my patent referred to above. The conveyor includes a belt 136 preferably a single belt of substantial width for example in the neighborhood of 10″ wide, trained on a vertical roller 138 at the entry or leading end thereof and a horizontal roller 140 at the delivery or trailing end thereof.

The roller 138 is mounted on a shaft 142 having a pulley 144 utilized for driving the roller and the belt by suitable means such as the same drive means that drives the belt 114 in the conveyor 110. A vertical idler roller 146 (FIGURE 2) is provided within the belt 136 to form a diagonal run 148 at the leading end thereof.

Associated with the twist belt is an auxiliary belt 150 of relatively short length, which may be substantially narrower than the twist belt. The auxiliary belt is trained on a roller 152 at the entry or leading end and another roller 154 at the delivery or trailing end thereof. The roller 152 is in vertical position while the roller 154 is inclined relative thereto and at such an angle, between the vertical and the horizontal, that the inner or lower run of the auxiliary belt lies in a surface shaped similarly to and closely adjacent the corresponding surface of the adjacent run of the twist belt, the auxiliary belt at its delivery end corresponding to the transverse inclination of the twist belt at that location. If desired it may actually engage the twist belt. The leading end of the auxiliary belt extends forwardly beyond the idler roller 146 to form a V-shaped bight or notch 156 with the run 148. The trailing end edge 157 of the shield 126 extends into the notch a substantial distance to a point relatively close to the apex of the notch so that the laundry piece when it reaches the end of the shield is in engagement with both the twist belt and the auxiliary belt. The shield 126 as indicated above leads into the notch for guiding the laundry piece thereinto. In the preferred arrangement of the construction, the auxiliary belt is driven although it is within the scope of the invention that that belt idle and be driven by friction engagement with the twist belt directly, or through the intermediary of a laundry piece therebetween. In the event spacing is provided between those belts, that spacing is of course to be less than the thickness of the thinnest laundry piece, doubled, to be folded.

The auxiliary belt 150 extends in trailing direction to the extent necessary, relative to the inclination of the twist belt, that the laundry piece will remain on the twist belt by friction, considering its approach to and final horizontal position.

The horizontal adjustability of the shield 126 enables positioning of the delivery end of the shield to facilitate gripping of the laundry pieces by the belts. The vertical adjustability of the delivery end of the shield positions the laundry pieces transversely of the twist belt and subsequent belts. This positioning is determined by vertical position on the laundry pieces relative to the leading end of the twist belt which is converted into horizontal positioning at the trailing end, it being desired that the laundry pieces be centered, transversely and horizontally, of the subsequent conveyors.

Relation between french fold means and quarter fold means

In the foregoing arrangement the french fold unit is over the quarter fold means, but the invention also includes an arrangement in which those two means or units are reversed, as shown in FIGURES 6 and 7.

In the latter case the two units are basically the same in construction as in the first mentioned arrangement, but with modifications to accommodate the different positioning. The french fold unit 160 has a shield 162 leading directly from the delivery end of the feedboard 36, the laundry pieces issuing from the latter directly onto the shield and conveyed by the belt 163, and after folding delivered onto the conveyor 164 corresponding to the extension conveyor 42.

The quarter fold means or unit 166 includes a vertical fold conveyor 168 including an endless belt 170, and having an upper horizontal portion 172 and an arm 174 swingable down into operative position and upwardly out of that position. This conveyor includes the narrow belt and pulleys mounted on structural members not materially thicker, axially of the pulleys, than the belt and pulleys.

A shield may be provided as in the case of the conveyor 110. The upper portion 172 of the conveyor leads to the twist belt, and the latter delivers the folded laundry pieces onto the conveyor 165 which in turn delivers them onto the conveyor 164.

Extension conveyor

The extension conveyor 42 serves as a means for receiving laundry pieces from both the quarter fold means 38 and the french fold unit, and continuing the conveyance of the pieces to subsequent conveyors. The extension conveyor 42 is of relatively short length and includes a belt 175 trained on a leading roller 176 and a trailing roller 177. A gap 178 exists between the roller 140 in the conversion conveyor or twist belt and the roller 176 in the extension conveyor. The roller 140 may be positioned higher than the roller 176 so that the laundry pieces leaving the twist belt are carried over the gap in suspended position and dropped onto the extension conveyor. In the case of the french fold conveyor means, the extension 91 may overlie the gap so that the french folded laundry pieces drop directly from the extension onto the extension conveyor. The conveyor may be driven by any suitable means, either directly or through another conveyor.

Beyond the extension conveyor 42 is another gap 182 on the far side of which is a fluted roll 184 of the kind disclosed and claimed in my patent referred to above, as is the folding means referred to next following. Beyond the fluted roll is a curved apron 186, extending through a slot in which is a finger of a microswitch 188 mounted on an adjustable arm 190. The laundry piece is conveyed over the gap 182 and it slides down the apron and when it engages the finger of the microswitch, a folding knife 192 is raised and driven through the gap 182 where it engages the laundry piece and produces a half fold, or cross-fold, therein. The crease of this fold is lifted into engagement with the intermediate or pickup conveyor 44 as referred to again hereinbelow. The arm 190 may be adjusted according to the length of the laundry pieces for folding them at the desired position such as in the middle, as described in detail in my patent referred to above. Other means of controlling this step in the folding of the pieces will be described hereinbelow.

Means is provided for selectively eliminating the half fold and conveying the pieces the remainder of the distance through the folder with additional folding. For this purpose the extension conveyor belt 175 is made of a plurality of transversely spaced elements 194 (FIGURE 8) the spaces between which receive prongs 196 of a deflecting device 198 having manual actuating means 200 which upon actuation thereof is operative for moving the prongs into and out of deflecting position. FIGURE 1 shows them in deflecting or active position in full lines and out of that position, or in retracted position, in dotted lines, and when they are in retracted position, the pieces pass over the gap 182 in the manner just stated. However, when they are in deflecting position, their upper ends bridge the space between the conveyor 42 and the pickup conveyor 44 and deflect the pieces directly to the pickup conveyor 44, in bypassing relation to the half folding means 192.

Intermediate or pickup conveyor

This intermediate or pickup conveyor 44 may be identical with that disclosed in my patent referred to above. It includes a lower belt 206 and an upper belt 208, the upper belt overhanging the lower at the leading end thereof to form a downwardly directed bight 210 for receiving the crease of the half folded laundry piece lifted by the folding knife 192. The two belts then convey the half folded towel to the final or delivery conveyor 46.

Final or delivery conveyor

The delivery or final conveyor 46 is substantially the same in construction as that disclosed and claim in my patent referred to above. This conveyor includes a belt or belt elements 220 and a pair of blades or "flippers" 222 (FIGURES 1 and 11) pivotally mounted for movement between an upper operative position directly under the belt, and a lower inoperative position, releasing the laundry piece which thereupon drops onto the stack table 34 as referred to again hereinbelow. This action is under the control of a switch 224 (FIGURES 1 and 13) actuated by the laundry pieces. The blades or "flippers" may be moved to their different positions by suitable means such as air cylinders 226 as fully disclosed in my copending application Ser. No. 457,742, referred to above.

Stack table

The stack table 34 as noted above is a separate unit from the folder unit and preferably detached therefrom except through electric and air lines which can easily be disconnected. It is desired that the top laundry piece of the stack, or the table top when no laundry pieces are thereon, be at a certain minimum distance below the delivery conveyor 46 to minimize any disturbance of the laundry pieces such as by air currents that would prevent perfect stacking. The present invention includes an arrangement for lowering of the table top according to the height of the stack, eliminating the disturbances to the stacking operation mentioned. The table top 240 is mounted on a base 242 by jointed legs 244 at the ends thereof, each including a pair spaced apart laterally. The legs are pivotally connected to the base and table top respectively and are joined intermediate their ends by pivot connections, for extension and collapsing of the legs, for correspondingly raising and lowering the table top. Connected across the legs of each pair a cross-piece 246 preferably in the lower section thereof and connected with each cross piece is a pull rod or link 248, the inner ends of which are connected to a disc 250 adjacent the periphery thereof. The disc is mounted for oscillatory movement on a vertical shaft 252 mounted in the base. Connected with the shaft is a radial arm 254 to which is connected, at a point eccentric to the axis of the disc, the outer end of a rod 256 of a piston in a cylinder 260 forming a power device identified as a whole as 262. The power device is preferably pneumatic acting having an air line 264 connected to the cylinder outwardly of the piston, and leading from a suitable source of air pressure (not shown). Provided in the air line is a control valve 266 operated by convenient means such as a solenoid 268, and upon opening of the valve the air under pressure enters into the cylinder outwardly of the piston, retracting the piston and drawing on the radial arm 254, which rotates the disc. This action draws the pull rods 248 inwardly and extends the legs 244 upwardly, raising the table top. Thereupon the valve is closed either manually or by a suitable automatic control means.

A bleed is provided in the cylinder as indicated at 270 which may assume any suitable form such, for example, as a manually adjustable throttling needle valve which is set to permit the escape of air from the cylinder at a controlled rate to permit the table top to lower at the same rate that the stack of laundry pieces rises thereon, thereby maintaining the top of the stack at a substantially constant space below the conveyor 46, for assisting in maintaining an even and uniform stack. Preferably tension springs 272 are connected between the legs 244 and a central fixed piece such as to bear a portion of the load of the table top and control its lowering movements. These springs will not fully support the table top, the latter lowering against the springs when the power device 262 is released. It is also within the scope of the invention to utilize an overcenter device, of known kind and in a known arrangement, with the springs 272, instead of the power device, which stably retains the table top in either full-up or full-down position, when moved thereto manually.

The stack table, being separate from the folder unit, may be positioned in any of various positions, such as leading off to the right, to the left, or straight ahead, with equal effectiveness, depending upon practical circumstances encountered in the particular installation of the apparatus. The table top is provided with conveyor means 274 for carrying the stack from the position in which it is formed under the delivery conveyor, outwardly therefrom to an access position facilitating removing the stacks from the stack table. The conveyor 274 is driven by a suitable means such as an electric motor 276 mounted on the table top and thereby carried therewith so that regardless of the position of the table the motor remains in fixed position relative to the conveyor, maintaining constant driving connection therewith.

The conveyor means 274 may include two separate conveyors 278 and 280, the former running constantly and the latter normally stationary, or it may consist of a single conveyor. The stack table is positioned with the conveyor 278 directly under the delivery conveyor 46 of the folder unit. The laundry pieces form into a stack and when the desired height is achieved, such for example as determined by a desired number of pieces such as 10, 15, 20, etc., the conveyor 278 (or the single conveyor when only one is provided) is then operated which carries the stack therefrom onto the constantly operating conveyor 280. The latter then carries the stack therealong until it is either lifted off or abuts an end stop 282.

It is desired that the conveyor 280 be operated automatically under the control of a counter which counts the laundry pieces; such a counter is indicated diagrammatically at 284 (see FIGURE 13) and it may assume any desired form, such for example as that described in my copending application Ser. No. 457,742, referred to above. The arrangement as described in that application is such that upon a predetermined number of pieces being placed in the stack, the counter means controls the circuit for energizing the driving motor for advancing the conveyor the extent desired, and then de-energizing the motor.

The stack table 34 may be provided with tamper means as shown in FIGURE 27; a pair of blades 285 are pivoted at 286 on posts 287 and biased downwardly by springs 288. They are drawn upwardly by an air cylinder 289 acting through a cross bar 290 and cables 291. The operation is synchronized with the operation under the control of the pieces themselves, so that the blades are raised to permit the pieces to be dropped, and then released to tamp the pieces. A single blade may be utilized, instead of two, preferably working on the folded edge. As will be understood, the operation as between the air cylinder and springs 288 may be reversed.

Circuit

FIGURE 13 shows the circuit of the apparatus, and includes legends of most of the operating components thereof referred to hereinabove and these need not be described in detail since it is believed it is self explanatory in relation thereto. However, the circuit also includes other elements and controls for use in conjunction with various functions referred to hereinbelow, in connection with which portions of the circuit will be described in detail.

Divider, or folding sensor

A preferred arrangement for sensing the laundry pieces and folding them at the desired location, such as the midpoint, is shown generally in FIGURE 14. In this form of the divider or folding sensor means, a PE cell 292 is provided, FIGURE 1 indicating a representative position thereof. In this figure the cell is arranged for projecting a beam between the french fold means and the pickup conveyor 44 and as so located may project it onto the twist belt 112 or the extension conveyor 42. The PE cell may be arranged for operation in connection with any of various kinds of conveyors and is not limited to any conveyor shown or indicated in FIGURE 1; for the purpose of illustrating its overall adaptability, attention is directed to FIGURES 14 and 15 showing the cell in conjunction with a conveyor 294 which may represent any of a wide variety of conveyors including the french fold belt 69 or the twist belt 112 of FIGURE 1. The conveyor 294 in the present instance, and for convenience, is shown to include a pair of spaced elements 296 defining a gap 298 therebetween. The PE cell is of known retroreflective type with which a reflector element 300 cooperates. The PE cell may be arranged for closing or opening circuit as desired, upon interruption of the reflected beam. The reflector 300 may be disposed in the gap 298 and thus adapted to be covered by the laundry piece 47 as it is carried along by the conveyor. As will be brought out in detail hereinbelow the length of time during which the laundry piece covers the reflector and interrupts the beam to the PE cell, predetermines a time interval in the folding operation.

The reflector 300 may be utilized in conjunction with a single element conveyor as indicated in FIGURES 16 and 17 where the reflector is disposed over the conveyor and is of such small thickness as to enable the laundry piece to move thereover notwithstanding the fact that the reflector is directly over the conveyor.

The PE cell 292 is incorporated in the circuit of FIGURE 13 (center) and in the present instance is constructed so as to provide a normally open path in the circuit, in a known manner. The circuit includes line conductors 310 and 312 leading from a suitable source of current. Leading from one of the line conductors, e.g., 310, is a conductor 314 having a switch 315 and the PE cell therein and leading to a normally closed switch 316 from which a conductor 318 leads to a motor 320, another conductor 322 leading from the motor to the other line conductor 313.

Mounted on the drive shaft of the motor 320 is a relatively small sprocket 324 for driving an endless chain 326 which is also trained on a relatively large sprocket 328 driven by a second motor 330. The large sprocket 328 may be removed for replacement by one of a different size, and the motor 330 may be of variable speed kind, to provide for different peripheral speeds of the sprocket 328 relative to the sprocket 324. A conductor 332 leads from the conductor 322 to the motor 330 and then to a conductor 334 which in turn leads to a pair of parallel normally open switches 336 and 338. Leading from these switches is another conductor 340 connected with a conductor 342 which leads to a switch 343 ganged with the switch 315 and selectively connectable with timers 344 and 345 associated with and operative for actuating respective ones of the switches 336 and 338. These timers are connected in a conductor 346 returning to the line conductor 312.

The conductor 342 also is connected in a multiple switch 348 in which is also connected a conductor 350 returning to the conductor 346. A common 352 leads from the switch 348 through a switch 354 to a conductor 356 returning to the line conductor 310. The switch 354 is manually movable to automatic and manual positions. Interposed in the conductor 356 is a normally closed microswitch 358 for controlling a "soil" ejecting operation as will be referred to again hereinbelow. The switch 348 has normally closed contacts between the conductor 342 and the common 352, and normally open contacts between the conductor 350 and the common.

In the dot-dash line position of the switch 315 the PE cell is in circuit, as would be another switch 359, when used instead of the PE cell. In the other position, two other switches 360 and 361 are in circuit, for use in folding other kinds of laundry pieces.

The upper run of the chain 326 is trained on an idler sprocket 362 on a switching lever 363 pivoted at 364 and having a long arm 365 and a short arm 366. The arrangement is such that upon rotation of the sprocket 324 while the other sprocket 328 is stationary, as does occur, the upper run of the chain 326 slackens enabling the long arm 365 to lower which permits the switch 348 to assume its normal condition. Then upon rotation of the sprocket 328, the upper run of the chain is drawn up, which raises the long arm 365 and actuates the switch 348 to its abnormal condition. This may also occur with both sprockets running at the same time, due to the greater peripheral speed of the sprocket 328. A safety measure is incorporated in the provision of the switch 316, in that if a fault should occur and the long arm 365 continues to lower, the short arm will eventually open the switch 316 and break the circuit to both of the motors 320 and 330. In normal operation however the switch 316 remains closed.

Leading from the conductor 342 is another conductor 368 having a normally closed, time delay mercury switch 370 therein. The conductor 368 leads to another conductor 372 having a normally open switch 373 therein and then through the switch 354 to the conductor 356 in return to the line conductor 310.

The conductor 368 leads to a solenoid 375 controlling a valve 376 and to another conductor 377 returning to the line conductor 312. The valve 376 is in an air line 378 which controls a pneumatic cylinder (not shown) for operating the folding knife 192 (FIGURE 1) for producing a half fold in the laundry piece. A specific manner of actuating the folding knife through the pneumatic cylinder may be of the kind described in my patent referred to above.

In the normal operation of the folder, the laundry piece 47 is placed on the conveyor 294 (FIGURES 14 and 15) and it moves along and covers the reflector 300 throughout its travel thereover. This retains the circuit through the motor 320 closed during that interval, which rotates the sprocket 324. At this time the sprocket 328 remains stationary, and slack is therefore produced in the upper run of the chain 326 permitting the switch arm 365 to lower, leaving the switch 348 in its normal position. At this time the timer 345 (in the assumed example) is energized and begins to time out and when it engages and closes the corresponding switch 338, a circuit is closed through the motor 330 which rotates the sprocket 328. This draws up the upper run of the chain and eliminates the slack therein which lifts the long arm 365 until it actuates the switch 348. This actuation opens the normally closed contacts between the conductors 342 and 352 opening the circuit through the timer. It closes the normally open contacts between the conductors 350 and 352 closing the circuit through the motor 330.

The greater size of the sprocket 328 relative to the sprocket 324 draws up the chain at a faster rate than it is slackened by the sprocket 324. Most often it is desired to fold the laundry pieces in the middle and for that purpose the sprocket 328 is of twice the size of the sprocket 324. As a consequence the slack in the chain is drawn up at a rate twice as fast as it is paid out so that the laundry piece travels one-half the distance while the sprocket 328 is moving that it travels while the smaller sprocket 324 is traveling. The arrangement is such that the larger sprocket begins to rotate at a point, for example, where the leading edge of the laundry piece passes over the folding knife and the latter therefore is actuated when one-half of the folding piece has traveled past the knife, and accordingly makes the fold in the middle of the piece. The timers 344, 345 are adjusted to initiate rotation of the larger sprocket 328 so that one-half of the laundry piece will have passed thereover at the actuation of the folding knife.

It is not essential that the smaller sprocket 324 terminate its rotation when the large sprocket 328 begins to rotate because the cumulative effect of the two sprockets running simultaneously can be calculated and be equivalent to each running singly. Additionally the motor 330 may be operated at a greater speed, as indicated above, to take up the slack in the chain.

An advantage of the use of the endless chain 326 arrangement is that the sprockets for driving it may be selected according to size for producing different results. For example, when it is desired to fold the laundry pieces in the middle, the sprocket 328 will be of twice the size as the sprocket 324, when other factors are normal. If it should be desired to fold the laundry pieces at a position other than the middle, one or the other of the sprockets may be replaced by one of a different number of teeth to obtain the operation of the folding knife at a position other than the middle. It may be desired also to vary the relation between the sprockets for reasons other than related to the position of folding the laundry pieces such as, for example, the impossibility of positioning the PE cell 292 (FIGURE 1) properly for accomplishing the folding step at the desired instant. The mechanical construction of the apparatus may be such that the PE cell cannot be arranged for impinging its rays at the exact midpoint of the intended range of movement. In that case the relation between the sprockets may be preselected to accomplish the folding step at the desired instant.

In connection with this same difficulty of positioning the PE cell, the apparatus is flexible in that the PE cell and the reflector 300 can be adjusted for the control step to be performed at different positions in the travel of the laundry piece. Attention is directed to FIGURE 14 showing a rack and pinion 293 operative for positioning the PE cell angularly to direct its rays anywhere within a wide range of angular adjustment, and the reflector 300 is adjustable to any position by means such as the rack and pinion 378. The different positions of the PE cell and the reflector thus effect the corresponding control operation at different points in the travel of the laundry pieces. Thus even if it should be impossible to position the PE cell as would be desired because of the mechanical construction of the folder, a wide range of adjustment is provided to accomplish the intended folding operation at the desired point.

The invention is also applicable to the use of switching means instead of the PE cell 292, as represented in FIGURES 18 and 19. In this case a microswitch 384 is provided having a finger 386 extending upwardly through the gap 298 in the conveyor. When the laundry piece 47 moves along the conveyor, it closes the switch 384 and controls the circuit of FIGURE 13 in precisely the same manner as described above in connection with the PE cell 292, it being understood that the switch is retained closed throughout the travel of the laundry piece thereover.

Figure 21:
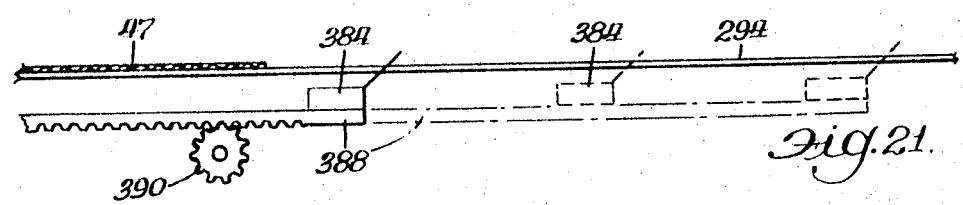
FIGURE 21 is a side view of an additional form of sensing means and conveyor means.

Various means may be provided for effecting adjustment of the switch 384, either by moving the position of that switch itself, or providing a plurality of similar switches selectively effective at different positions. For example as shown in FIGURE 21 the switch may be mounted on a rack 388 actuated by a pinion 390, for positioning the switch in any of the various positions indicated, for actuation by the laundry piece at different points in the travel thereof for actuation of the folding means at different positions in the laundry piece.

FIGURE 20 shows another arrangement for the same general purpose but utilizing a plurality of switches for selectively bringing into operation. In this case a plurality of switches 392, 394 and 396 are mounted on extensible members or jacks 398 which when actuated raise and lower the switches into and out of operative position. These switches may be positioned for corresponding to laundry pieces of different lengths so as to actuate the folding means 192 at the proper time according to the length of the laundry piece.

Figure 22:
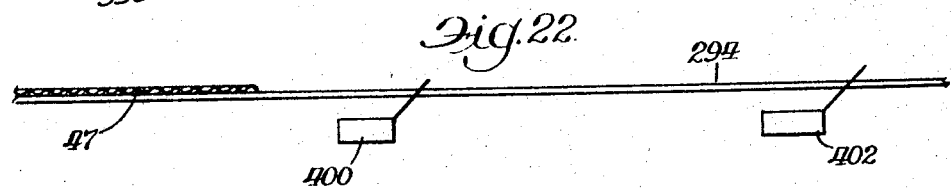
FIGURE 22 is a side view of yet another form of sensing means and conveyor means.
Figure 23:
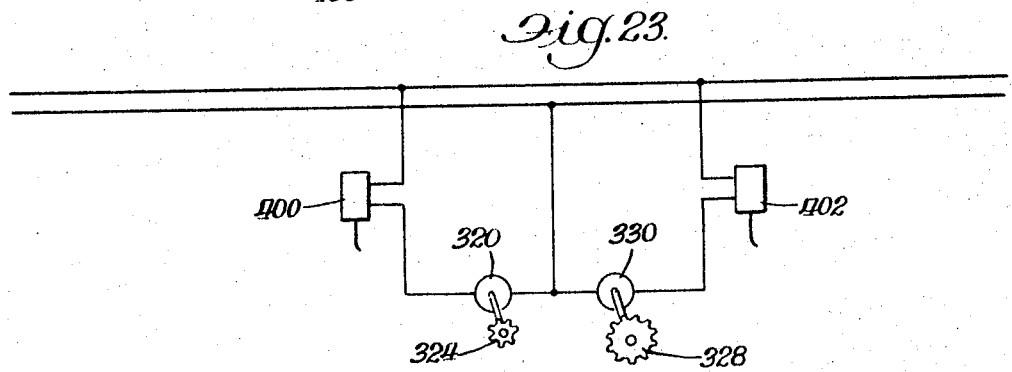
FIGURE 23 is a circuit diagram utilizing the arrangements of FIGURE 22.

A further alternative of control is shown in FIGURE 22 which utilizes a first switch 400 for controlling the motor 320 for the small sprocket and a second switch 402 for controlling the motor 330 for the larger sprocket 328. FIGURE 23 shows the incorporation of these two switches in the main portion of the circuit of FIGURE 13. So long as the laundry piece actuates the first switch 400, i.e., during that interval in which it is riding thereover, the circuit remains closed through the motor 320 and after the trailing edge of the laundry piece passes over that switch, that portion of the circuit then again opens. The second switch 402 is so positioned that when actuated by the laundry piece, it closes the circuit through the motor 330, and so long as the laundry piece rides over that switch, the larger sprocket continues to rotate and take up the slack in the chain as described above.

Figure 24:
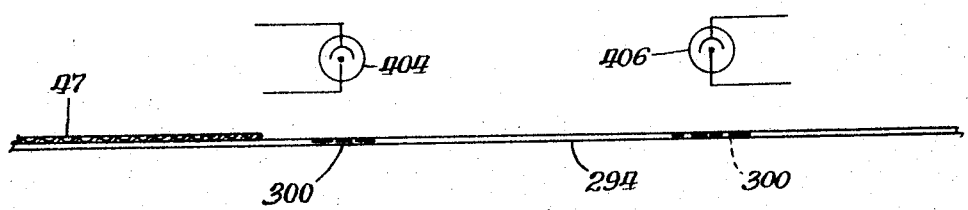
FIGURE 24 is a side view of a further form of sensing means and conveyor means.

A still further modification is shown in FIGURE 24. PE cells 404 and 406 are utilized instead of the switches 400 and 402, respectively, of FIGURE 22 and with the same kind of operation, and same result, as involved in the use of the switches.

FIGURE 13a shows another control arrangement. The switch to be controlled is shown at 348 (as in FIGURE 13) and actuated by the plunger 403 of an air cylinder 405. The plunger is retracted by air from a line 407 controlled by a valve 409 passing air at a relatively slow rate, and is projected by a spring 411 upon opening of the exhaust valve 413 which permits air to escape at for example twice the rate as the valve 409. The valves may be solenoid-operated under the control of the switches 400 and 402.

FIGURES 25 and 26 show a still different arrangement for controlling the folding of the laundry pieces, this form being of mechanical nature. In this arrangement a constantly operating motor 408 is provided, having a drive shaft 410 with small and large driving pulleys 412 and 414 thereon. Trained on these pulleys are belts 416 and 418, one of them being twisted, which are also trained on driven pulleys 420 and 422 slidably and rotationally mounted on a driven shaft 424. The driven pulleys 420 and 422 have friction clutch elements 426 and 428 thereon engageable respectively with driven elements or discs 430 and 432 fixed on the driven shaft 424. The driven pulleys 420 and 422 are slidable together by an arm 434 biased to a neutral position by springs 436 but swung in one direction or the other by solenoids 438 and 440 which in turn are controlled by switches 400 and 402 identified above. One of the discs, e.g., 430, is provided with a finger 442 arranged for actuating the microswitch 188 identified above for controlling the folding blade.

In the operation of the apparatus of FIGURES 25 and 26, as a laundry piece is placed on the conveyor and engages the first switch 400, it energizes the solenoid 438. The solenoid draws on the arm 434 and shifts the pulley 420 into driving engagement with the corresponding disc 430 which in turn rotates the driven shaft 424 and advances the finger 442 from its normal stationary position indicated (FIGURE 26) in an arbitrarily selected direction such as clockwise. When the laundry piece then engages the finger of the second switch 402, the solenoid 440 overpowers the first solenoid 438 and draws the arm 434 in the opposite direction, withdrawing the driven pulley 420 from its driven disc and shifts the other driven pulley 422 into driving engagement with the disc 432. Because of the larger size of the driving pulley 414 relative to the other pulley 412, the driven shaft 424 is driven at a correspondingly greater speed, such as twice the speed, and in the opposite direction, and the finger 442 is moved back at a greater speed until it actuates the microswitch 188. The resulting folding operation is similar to that described above, the faster travel of the actuating finger 442 produced by the larger pulley 414 effects the folding step at an intermediate position, such as in the example assumed, the middle. Upon removal of the laundry piece from the conveyor, the switches 400 and 402 move to their normally open position. The foregoing cycle is repeated in response to another laundry piece again progressing along the conveyor.

Ejector means

Attention is directed next to novel means for ejecting unwanted or defective laundry pieces from the apparatus. Such apparatus is shown in FIGURES 1, 4 and 5 and certain switch means and related elements are also included in the circuit diagram of FIGURE 13. The ejector means includes two separate units or sections which are identical or similar in construction and each may be related to, for example, soiled pieces, torn pieces, etc. The ejector means indicated in its entirety at 450 includes a pair of wheels or discs 452 and 454 mounted for rotation on a shaft 456 and driven by a suitable means such as an electric motor 457. The peripheral speed of the wheels is to be directly proportional to the speed of the laundry pieces through the folder and therefor the wheels may be driven from the drive to the conveyor means of the folder instead of in the manner shown. The wheels are made of suitable material such as wood or steel with a circumferential groove 458 in its periphery the side wall surfaces of the groove being covered with resilient and high-friction material 460. A solenoid 462, 464 is provided for each wheel, the solenoids each having an armature 466 working in a sleeve or tubular element 468 of a hopper 470. A plurality of balls, such as steel balls 472 are provided having a home position in the hopper. Associated with the solenoid 462 is the switch 358 and with the solenoid 464 is a switch 474 (see also FIGURE 13), controlled by pushbuttons 478 and 480 conveniently located at the front of the folder (FIGURE 1) for actuation by the operator. Upon depression of either of the pushbuttons, the corresponding solenoid is energized, projecting the armature or plunger 466 thereof forward, and forcing a ball 472 into the groove 458 of the corresponding wheel. The balls and the grooves are so relatively dimensioned that the balls can be easily forced into the grooves, but are held there by the friction established by the side wall surfaces of the grooves. The balls are then carried around with the wheels and they engage the switches for performing the control operations. For example, the switch identified above and shown in the diagram of FIGURE 13 is positioned for engagement by the balls in the wheel 452 and when that switch is actuated in this case opened, it opens the circuit to the solenoid valve 376 (FIGURE 13), disabling the folding knife 192. As a result the laundry piece, instead of being cross folded by that folding knife, is permitted to pass thereover, and slide over the curved apron 186 and into a reject receptacle 482.

The switches 358 and 474 are mounted on suitable means such as curved balls 484 (FIGURE 1) concentric with the wheels, for adjustment circumferentially of the wheels to adjustably predetermine the interval between the time the pushbutton is actuated and the switch is actuated so that the laundry piece travels the intended distance through the folder. For example, when the operator places a defective piece on the feedboard, she would at that time observe that it was defective and should be ejected, and depresses the corresponding pushbutton 478, 480. The time after depression of the pushbutton that the switch is actuated corresponds to the time that the laundry piece reaches the curved apron 186.

After the ball passes by the switch it continues to move around with the wheel and is removed from the groove by a finger 486, which is an element of the hopper 470 and which then drops into the hopper. The number of balls utilized is of course determined by the maximum possible number of defective laundry pieces that would be encountered in a predetermined time.

A single unit of the ejector means would suffice for ejecting all of the defective laundry pieces, but it may be desirable to eject the pieces according to the condition thereof such as soiled, torn, etc. as indicated above and to eject them from the apparatus at different times or at different positions. In the present instance two such units are provided but of course any number more than two can be utilized as will be understood. While the soiled pieces are ejected over the apron 186, torn pieces may be ejected beyond the final conveyor 46. In such case the switch 474 is arranged for preventing operation of the blades or flippers 222 of that conveyor (see circuit of FIGURE 13) and instead of the pieces being dropped into the stack, the flippers remain in upper confining position and the pieces pass out of the extreme end of the folder and into a receptacle 488.

Jam indicator and pacer

A switch 490 is provided in the circuit and arranged in a convenient location (right, FIGURE 1) for actuation by each laundry piece as it passes along the conveyor means. Upon actuation it causes momentary energization of a solenoid 492 (FIGURE 13, right bottom) the armature 494 of which engages a time delay control element 496, of known kind, which in turn interrupts circuit to a normally lighted lamp 498. The control element 496 holds the light off for an interval according to its operating characteristics, after which the light is turned on. If the pieces should jam in the folder, the absence of the pieces actuating the switch would result in a constant light signal.

The timing of the control element 496 may be preselected as to its time interval, so as to correspond with a desired rate of feeding the pieces into the folder. So long as the pieces are fed at that rate, the light remains extinguished but if the operator should feed the pieces more slowly than the desired and predetermined rate, the light will come on, indicating such slower rate of operation, or pace.

While I have disclosed herein certain preferred forms of the invention, it will be understood that changes may be made therein within the spirit and scope of the appended claims.

I claim:

1. A laundry folder comprising conveyor means for conveying laundry pieces therethrough and including a feedboard and a pair of parallel segments posterior thereto, folding means operatively associated with each said segment, a first one of the segments having an entry end positioned for receiving laundry pieces from the delivery end of the feedboard, and together with the feedboard constituting an effectively continuous conveyor means working along a first path, and the second conveyor segment having a portion at its entry end movable into and out of an operative position, said movable portion having a leading element at its extreme leading end which, when the movable portion is in operative position, extends into said first path and deflects the laundry pieces from that path, and in bypassing relation thereto, and onto the movable portion of the second conveyor segment, the second conveyor segment thereby together with the feedboard constituting an effectively continuous conveyor means.

2. The invention set out in claim 1 wherein the conveyor segments are vertically superposed, and the movable portion of the second conveyor segment is movable in vertical directions.

3. The invention set out in claim 1 wherein the feedboard is operative for receiving and conveying laundry pieces in flat condition, the second conveyor segment is above the first conveyor segment and the said movable portion is movable downwardly into operative position, the folding means associated with the first conveyor segment being a quarter folder and including means at its entry end for forming a vertical fold, the folding means associated with the second conveyor segment being a french folder, the movable portion of the second conveyor segment including a flat plate which includes said leading element, and when said movable portion is in operative position, said leading element is disposed anterior to said vertical folding means.

4. The invention set out in claim 2 and including a conveyor means posterior to said parallel conveyor segments and continuing in the same general longitudinal direction as those conveyor segments, the posterior conveying means forming an effective continuation of the first conveyor segment, and the second conveyor segment having a delivery end over and beyond the delivery end of the first conveyor segment and operative for delivering laundry pieces onto the posterior conveyor means.

5. The invention set out in claim 1 wherein the conveyor segments are vertically superposed, the folding means associated with the upper conveyor segment is a quarter folder and the movable portion thereof is operative for forming a vertical fold, the folding means associated with the lower conveyor segment being a french folder, and including a flat plate imediately posterior to the delivery end of the feedboard and positioned for receiving laundry pieces therefrom.

6. A laundry folder comprising conveyor means for conveying laundry pieces therethrough and including a main conveyor belt of substantial width operative for supporting laundry pieces of as great width at all points across the width of the laundry pieces, the main conveyor belt having an entry end on a substantially vertical axis and a delivery end on a substantially horizontal axis, and means anterior to said main conveyor belt for forming a vertical fold in the laundry pieces, an auxiliary conveyor belt of substantially lesser width and length than the main conveyor belt having a leading end adjacent the entry end of the main conveyor belt and extending toward the delivery end thereof and following the inclination thereof, and having a trailing end spaced a substantial distance from the delivery end of the main conveyor belt, the auxiliary conveyor belt also being positioned adjacent the upper edge of the main conveyor belt, the auxiliary conveyor belt cooperating with the main conveyor belt at the entry end of the latter to grip laundry pieces therebetween while the laundry pieces are in vertical position, the gripping action being along the upper edge of the laundry pieces, while at their lower portion they drape and fall free, the conveyor belts maintaining gripping action on the laundry pieces in their progress along the main conveyor belt in increasingly inclined position and the draped lower portions lie on the main belt, until the laundry pieces pass beyond the auxiliary conveyor belt where they are in position sufficiently close to the horizontal that friction between the laundry pieces and the main conveyor belt is sufficient to prevent the laundry pieces from sliding off of the main conveyor belt notwithstanding their passage beyond the auxiliary conveyor belt, and the main conveyor belt is thereby operative for solely supporting and conveying the laundry pieces.

7. The invention set out in claim 6 wherein said main conveyor belt and auxiliary belt at the entry end have portions defining angularly disposed runs forming a V-notch for receiving laundry pieces thereinto and between the belts for gripping action by the latter.

8. The invention set out in claim 6 wherein the vertical folding means includes a conveyor segment operative for conveying the laundry pieces in vertical folded position into the space between said conveyors, and means is provided for positioning the laundry pieces between said belts and thereby on the main conveyor belt controllably and adjustably relative to transverse relation to the belt.

9. The invention set out in claim 3 wherein the feedboard has a flat upper surface supporting the laundry pieces, the flat plate of the movable portion of the second conveyor segment projects below that upper surface when the movable member is in operative position, and the second conveyor segment includes a belt over and cooperating with the flat plate and gripping the laundry pieces therebetween for conveying them therealong.

10. The invention set out in claim 9 wherein the folding means associated with the upper conveyor segment is a french folder having folding construction associated with the portion of the conveyor posterior to said movable portion, which itself includes a flat plate, the movable portion being so constructed and positioned that when it is in operative position the flat plate thereof is disposed relative to the flat plate of the posterior position so that the two flat plates perform an effectively continuous flat plate for conveying of the laundry pieces therealong.

References Cited

UNITED STATES PATENTS

| | | | |
|---|---|---|---|
| 361,376 | 4/1887 | Scott | 270—81 X |
| 1,313,712 | 8/1919 | MacFarland | 270—86 |
| 2,579,746 | 12/1951 | Malott | 270—66 |
| 2,751,222 | 6/1956 | Dexter | 270—81 |
| 2,770,457 | 11/1956 | Jesus | 270—68 |

FOREIGN PATENTS 568,787  1/1933  Germany.

EUGENE R. CAPOZIO, Primary Examiner

PAUL V. WILLIAMS, Assistant Examiner

U.S. Cl. X.R.

270—67